No. 746,552. PATENTED DEC. 8, 1903.
G. MOORE.
REVOLUBLE FILTER.
APPLICATION FILED OCT. 30, 1902.
NO MODEL. 2 SHEETS—SHEET 1.
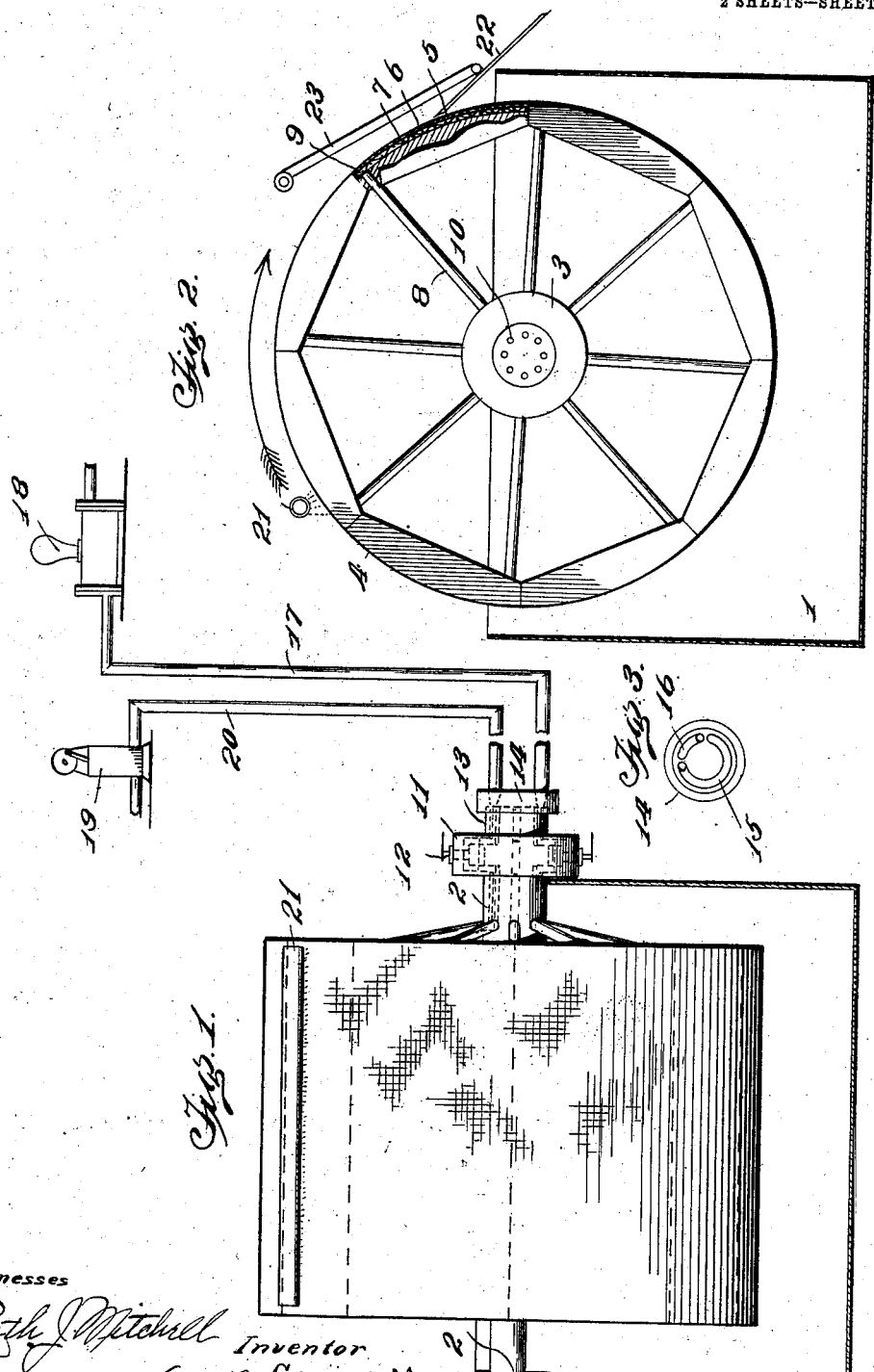
Witnesses
Inventor
George Moore
By
Attorneys

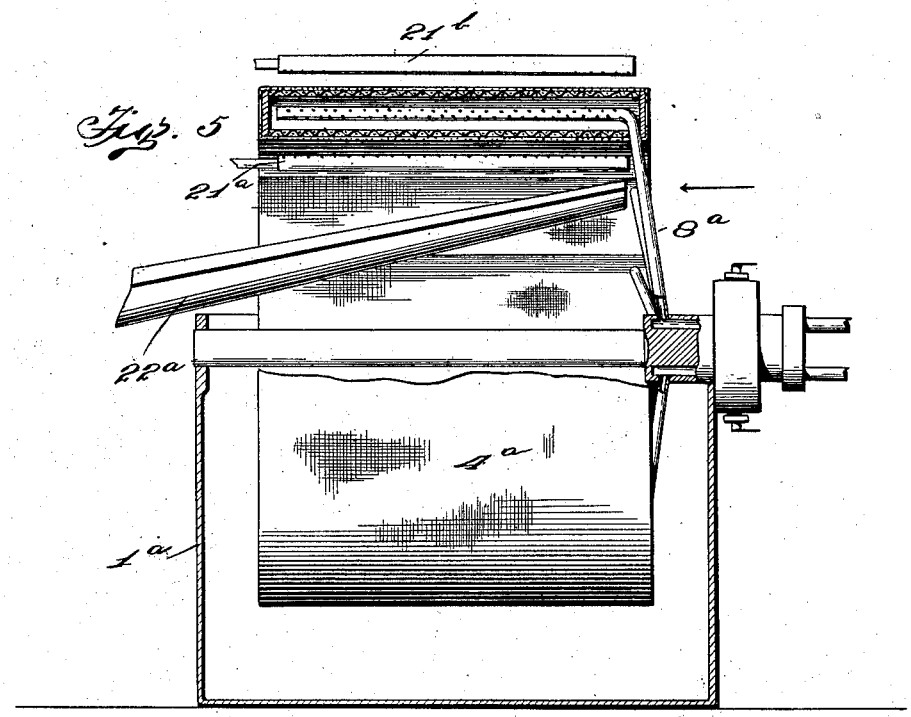
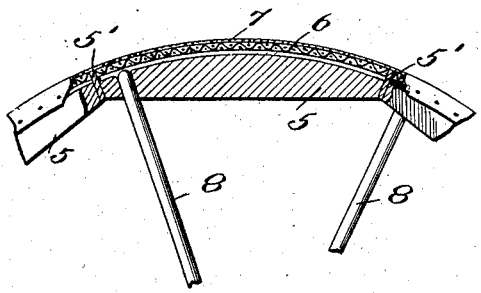
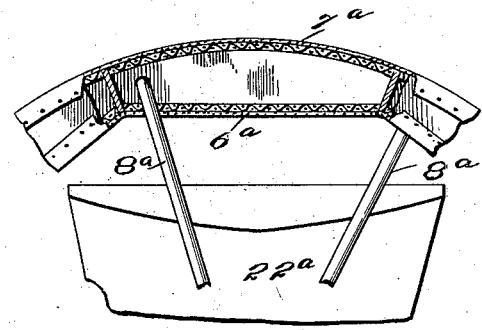

No. 746,552. Patented December 8, 1903.

UNITED STATES PATENT OFFICE.

GEORGE MOORE, OF SALT LAKE CITY, UTAH.

REVOLUBLE FILTER.

SPECIFICATION forming part of Letters Patent No. 746,552, dated December 8, 1903.

Application filed October 30, 1902. Serial No. 129,430. (No model.)

*To all whom it may concern:*

Be it known that I, GEORGE MOORE, a citizen of the United States, residing at Salt Lake City, in the county of Salt Lake and State of Utah, have invented certain new and useful Improvements in Revoluble Filters; and I do hereby declare the following to be a full, clear, and exact description of the invention, such as will enable others skilled in the art to which it appertains to make and use the same.

The present invention relates to improvements in filters; and the object in view is the maintenance of a comparatively clean filtering device by the employment of an automatic cleaning mechanism.

It consists, in combination with a suitable receptacle, of a revolubly-mounted filter extending into the same, means for subjecting the filtering medium to a drawing operation while within the receptacle, and means for subjecting the same to a blowing operation when out of the same.

It further consists in certain other novel constructions, combinations, and arrangements of parts, as will be hereinafter fully described and claimed.

In the accompanying drawings, Figure 1 represents a view in side elevation of a filter embodying the features of the present invention, the containing-receptacle being shown in section. Fig. 2 represents a view in end elevation of the same. Fig. 3 represents a detail side elevation of the valve-tap. Fig. 4 represents an enlarged detail fragmentary sectional view of a filter-plate and surrounding parts. Fig. 5 represents a view, partly in section and partly in elevation, of a modified form of the present improved filter. Fig. 6 represents an enlarged detail fragmentary sectional view of a section of filter, taken through Fig. 5 and looking in the direction of the arrow.

By the present invention I contemplate accomplishing the filtering operation by the use of a filter adapted to be alternately submerged into the bath to be filtered and then automatically cleansed, such functions being accomplished by the elements disclosed in the accompanying drawings, in which—
1 represents any suitable containing-receptacle for the material to be filtered, which forms bearings for journals 2 2 in its side walls, said journals being extended ends of the hollow hub 3 of a filter-wheel 4. The wheel 4 is made up of sections of filter-plates 5, each of which is divided from the next contiguous sections by division-walls 5' 5', upon the outside of each of which sections is arranged a suitable gauze 6 and filtering fabric 7, the spokes 8 of said wheel being hollow and communicating with the said plates 5, each of the plates being formed with an aperture 9 for permitting the respective spoke 8 to communicate with the inner surface of the filtering medium. The inner end of each spoke 8 penetrates the hub 3 and communicates with a longitudinally-arranged tube 10, each of which tubes in turn extends forwardly through one of the journals 2. The outer end of the said journal carries a head 11 and the tubes 10 extend outwardly and about said head, a suitable valve 12 being carried by the head for each of the tubes, whereby communication through said tube may be cut off. Beyond the head 2 is a further extension of the journal, as at 13, the tube 10 passing to the outer end thereof. A valve-cap 14 surrounds the outer end of said extension 13 and is provided with a segmental groove 15 on its inner face extending approximately two-thirds of the circumference of said cap, and a similar groove 16 lies in the same circular plane and has its ends placed a short distance from the ends of the groove 15. A tube 17 communicates with groove 15 and also with a suction-pump 18, and groove 16 is maintained in communication with a compression-pump 19 by means of a suitable tube 20. The wheel 4 with its hub and journals is revolved by any suitable means, (not shown,) the cap 14 being held against revolution.

Any suitable spray 21 may be arranged above the periphery of wheel 4, and a scraper 22 is spaced therefrom for removing the heavier solids which may cling to the said periphery. The spray 21 simply consists of a longitudinally-arranged tube provided with a series of small apertures for receiving a cleansing liquid from any suitable source of supply, and the scraper 22 consists of a longitudinally-arranged plate pivotally carried by an arm 23, with the greater portion of its weight below the pivot-point, so that the same will assume a diagonal plane normally supported with its upper edge contiguous the periphery of wheel 4.

In operation the material to be filtered is introduced into receptacle 1 and the wheel 4 is rotated, the pumps 18 and 19 being set into action. As the various sections of the wheel 4 enter the material within the receptacle 1 the groove 15 is brought into register with the respective tube 10 corresponding with the said section, whereby the sucking action of the pump 18 is brought to bear upon the filtering medium carried by the plate 5, the liquid within receptacle 1 thereby being drawn through said filtering medium and out the respective spoke 8 and tube 10 and through the tube 17 and pump 18. This drawing action is continued until wheel 4 has been revolved sufficiently to bring the section beneath the spray 21, and the drawing action causes the cleansing liquid from said spray to penetrate the solids upon the periphery of the wheel 4 and through the filtering medium into the spokes 8 and tubes 10 and to the pump 18. As soon as this operation is completed the respective tube 10 in the further movement of the wheel 4 is brought into register with the groove 16, whereby the respective section of filter is subjected to a blowing action, thereby dislocating the solids carried by said filter, which solids are directed by the scraper 22 away from the receptacle 1. When it is desired to throw any one of the sections out of action, it is only necessary to turn the corresponding valve 12, thereby shutting off communication with both the pumps 18 and 19.

The structure specified may of course be altered to some extent without deviating from the spirit of the present invention, and many such alterations are contemplated—such, for instance, as seen in Figs. 5 and 6, as the forming of the inner and outer surface of the wheel 4ª of filtering medium 6ª 7ª and arranging a spray 21ª, similar to that shown at 21, for throwing a stream against the inner surface of the inner filtering medium, and a like spray 21ᵇ for throwing a stream against the outer surface of the outer filtering medium. Of course when the structure just described is employed some form of trough or receiver, as 22ª, must be introduced within the wheel 4ª for directing the solids blown from the inner filtering medium beyond the edge of the receptacle 1ª, this being accomplished readily by reason of the fact that the filter-wheel is carried by spokes 8ª, similar in all respects to spokes 8, at one end, leaving the other end open, through which open end the discharge end of trough 22ª is extended.

As clearly seen in Figs. 4 and 6, the various sections of the filtering medium are divided or separated by partition-walls, which confine the drawing or blowing action to a given section and permit such action to take place in a given section independently of the next contiguous sections.

Having thus fully described my invention, what I claim as new, and desire to secure by Letters Patent, is—

1. In a filter, the combination with a suitable receptacle, of a wheel revolubly mounted thereon and having its periphery extending thereinto, a filtering medium carried by said periphery, a spray supplying a cleansing fluid to the said periphery outside the receptacle, means for subjecting the filtering medium to a drawing action while within the receptacle and while under the action of said spray, and means for subjecting the said medium to a blowing action after leaving the spray, substantially as described.

2. A filter comprising a series of filter-sections, a tube extending throughout the length of each filter-section within the same, and means for producing an alternate drawing and blowing action within each of said tubes, substantially as described.

3. A filter comprising a series of filter-sections, sprays discharging on both sides of said filter-section, and means for producing a drawing action within said tubes, substantially as described.

4. A filter comprising a series of annular-arranged filter-sections, each made up of filtering media spaced apart, communicating means arranged between such media, and means for producing a drawing action within said communicating means, substantially as described.

5. In a filter, the combination with a suitable receptacle, an annular filter proper revolubly mounted therein, tubular spokes supporting and communicating with said filter proper and arranged at one end thereof, and means for passing the filtered material out of said spokes, and a discharge-trough extending between the annular walls of said filter proper, substantially as described.

6. A filter, comprising a wheel formed with filtering medium upon its outer and inner surfaces, and means extending between said surfaces for effecting a filtering action through said medium, substantially as described.

In testimony whereof I hereunto affix my signature in presence of two witnesses.

GEORGE MOORE.

Witnesses:
A. L. HOPPAUGH,
J. B. HAWKES.